(12) United States Patent
Imai

(10) Patent No.: US 10,178,257 B2
(45) Date of Patent: Jan. 8, 2019

(54) MONITORING DEVICE, MONITORING METHOD, AND NON-TRANSIENT COMPUTER-READABLE RECORDING MEDIUM THAT RECORDS MONITORING PROGRAM

(71) Applicant: SEIKO EPSON CORPORATION, Tokyo (JP)

(72) Inventor: Toshie Imai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/703,754

(22) Filed: Sep. 13, 2017

(65) Prior Publication Data

US 2018/0115674 A1    Apr. 26, 2018

(30) Foreign Application Priority Data

Oct. 25, 2016    (JP) ................. 2016-208387

(51) Int. Cl.
*G06F 15/00*    (2006.01)
*H04N 1/00*    (2006.01)

(52) U.S. Cl.
CPC ..... *H04N 1/00896* (2013.01); *H04N 1/00042* (2013.01); *H04N 1/00079* (2013.01); *H04N 1/00323* (2013.01); *H04N 1/0083* (2013.01); *H04N 1/00344* (2013.01); *H04N 2201/0039* (2013.01); *H04N 2201/0094* (2013.01)

(58) Field of Classification Search
CPC .......... H04N 1/00896; H04N 1/00323; H04N 1/00042; H04N 2201/0039; H04N 2201/0094; H04N 1/00344; H04N 1/0083; H04N 1/00079
USPC ....................................... 358/1.14
See application file for complete search history.

(56) References Cited

U.S. PATENT DOCUMENTS

| 2014/0055800 A1* | 2/2014 | Matsumoto | G06F 3/1211 358/1.13 |
| 2014/0160525 A1* | 6/2014 | Kikuchi | G06F 3/1221 358/1.15 |
| 2017/0070642 A1* | 3/2017 | Miyamoto | B41J 29/00 |

FOREIGN PATENT DOCUMENTS

JP    2012-221193    11/2012

* cited by examiner

*Primary Examiner* — Saeid Ebrahimi Dehkord
(74) *Attorney, Agent, or Firm* — Workman Nydegger

(57) ABSTRACT

A monitoring device that acquires device information to be collected from a device includes an operation finish notification acquiring section that acquires an operation finish notification indicating that a predetermined operation performed by the device has been finished, and a device information acquiring section that acquires the device information from the device with a trigger of the acquisition of the operation finish notification. A monitoring method for acquiring device information to be collected from a device includes acquiring an operation finish notification indicating that a predetermined operation performed by the device has been finished, and acquiring the device information from the device with a trigger of the acquisition of the operation finish notification.

17 Claims, 10 Drawing Sheets

FIG. 5

OPERATION FINISH NOTIFICATION — 610

- FINISH OF PRINTING
- FINISH OF SCANNING
- FINISH OF FACSIMILE TRANSMISSION
- FINISH OF FACSIMILE RECEPTION
- ......

FIG. 6

PROCESSING TABLE — TA1

| OPERATION FINISH NOTIFICATION | PROCESSING |
|---|---|
| FINISH OF PRINTING | ACQUISITION OF PRINTER INFORMATION |
| FINISH OF SCANNING | ACQUISITION OF SCANNER INFORMATION |
| ...... | ...... |

FIG. 7

PRINTER INFORMATION — 621, 620

| | |
|---|---|
| REMAINING AMOUNT OF INK | (REMAINING AMOUNT OF CONSUMABLE ITEM) |
| USAGE PERIOD OF ROLLER | (USAGE PERIOD OF CONSUMABLE ITEM) |
| MODEL NUMBER OF INK | (MODEL NUMBER OF CONSUMABLE ITEM) |
| PRINT COUNT | (FOR BILLING) |
| ...... | |

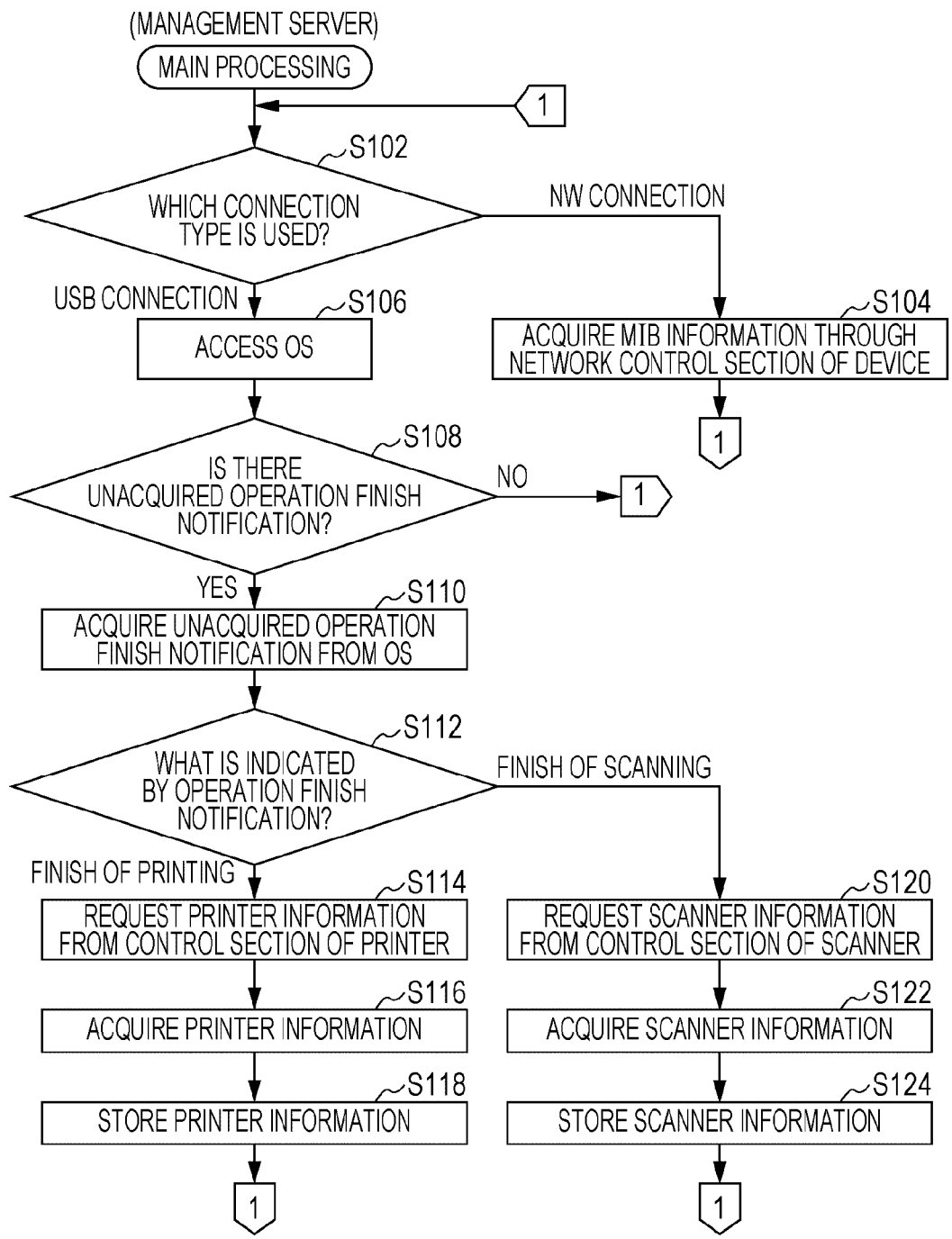

MONITORING DEVICE, MONITORING METHOD, AND NON-TRANSIENT COMPUTER-READABLE RECORDING MEDIUM THAT RECORDS MONITORING PROGRAM

BACKGROUND

1. Technical Field

The present invention relates to a technology for acquiring device information from a device.

2. Related Art

Network connection is made among devices such as a printer, a scanner, a facsimile machine, and a multifunction peripheral (example of a multifunction device) having functions of those devices in addition to a server computer and a client computer. In order to reduce power consumption of those devices, there are used devices that are shifted to a sleep mode (referred to also as a power saving mode) in which the power consumption is low when the devices are not used for a predetermined period of time. In order to monitor remaining amounts or the like of consumable items such as ink in the respective devices, a monitoring server is installed to collect device information. When device information is collected from a device in the sleep mode, the device recovers from the sleep mode and the power consumption increases.

JP-A-2012-221193 describes a problem that, when a device polled by a server is in a sleep mode, the device recovers from the sleep mode and consumes electric power unnecessarily. A device management system described in JP-A-2012-221193 sets a long polling interval for a device which is used less frequently based on a device usage frequency of a client logging into the server, thereby reducing the number of times the device in the sleep mode is polled.

In the setting of the polling interval based on the device usage frequency, it is uncertain whether the device is in the sleep mode. Therefore, the device may be in the sleep mode when polled. In this case, electric power is consumed unnecessarily.

SUMMARY

An advantage of some aspects of the invention is that a technology capable of reducing power consumption of a device is provided.

According to a first aspect of the invention, there is provided a monitoring device that acquires device information to be collected from a device. The monitoring device includes an operation finish notification acquiring section that acquires an operation finish notification indicating that a predetermined operation performed by the device has been finished, and a device information acquiring section that acquires the device information from the device with a trigger of the acquisition of the operation finish notification.

According to a second aspect of the invention, there is provided a monitoring method for acquiring device information to be collected from a device. The monitoring method includes acquiring an operation finish notification indicating that a predetermined operation performed by the device has been finished, and acquiring the device information from the device with a trigger of the acquisition of the operation finish notification.

According to a third aspect of the invention, there is provided a non-transient computer-readable recording medium that records a monitoring program for acquiring device information to be collected from a device. The monitoring program causes a computer to implement an operation finish notification acquiring function for acquiring an operation finish notification indicating that a predetermined operation performed by the device has been finished, and a device information acquiring function for acquiring the device information from the device with a trigger of the acquisition of the operation finish notification.

BRIEF DESCRIPTION OF THE DRAWINGS

The invention will be described with reference to the accompanying drawings, wherein like numbers reference like elements.

FIG. 5 is a diagram schematically illustrating an example of contents of an operation finish notification.

FIG. 6 is a diagram schematically illustrating an example of details of a processing table.

FIG. 7 is a diagram schematically illustrating an example of details of device information.

FIG. 8 is a flowchart illustrating an example of main processing to be performed by a management server.

DESCRIPTION OF EXEMPLARY EMBODIMENTS

Figure 1:
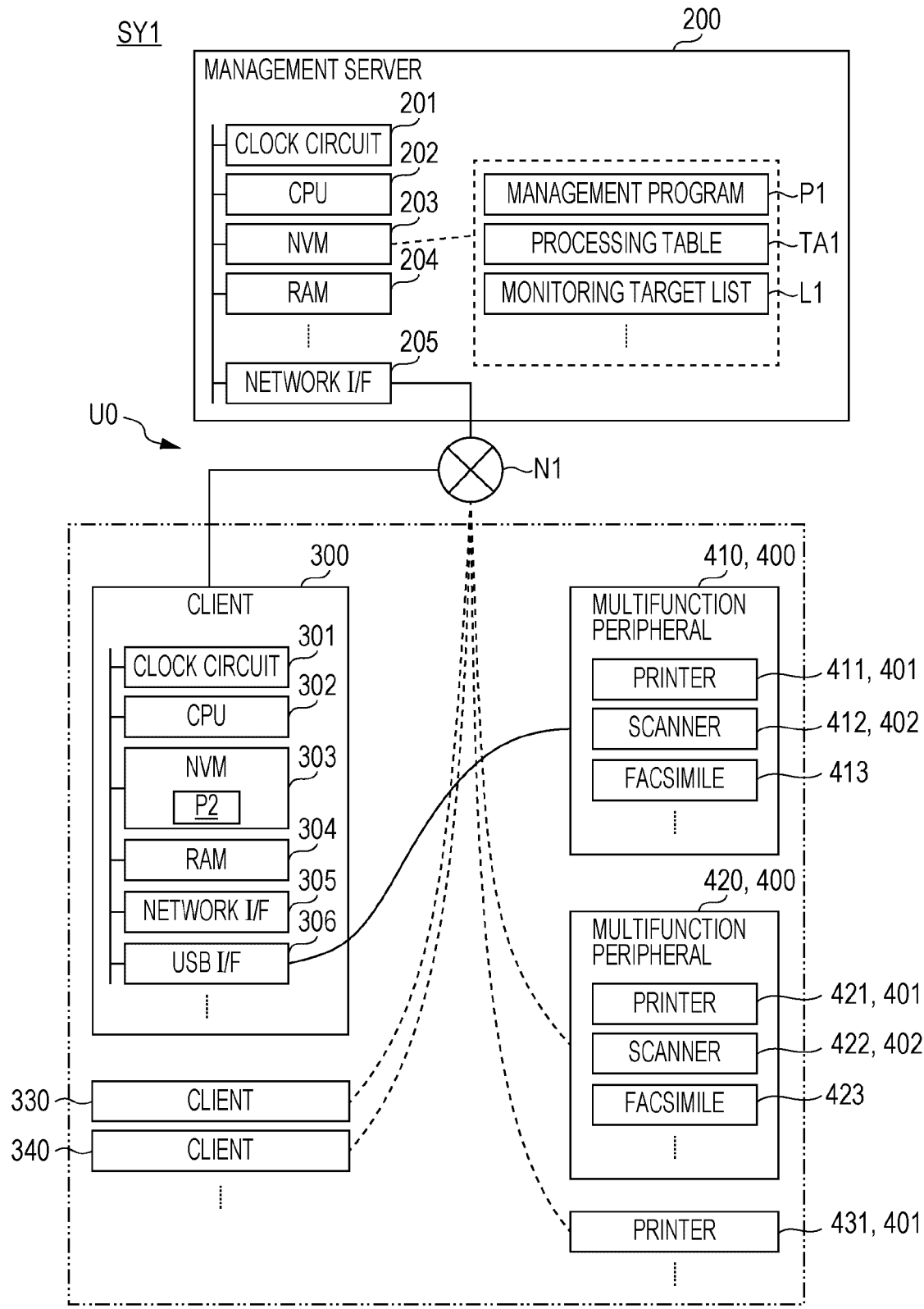
FIG. 1 is a block diagram schematically illustrating an example of a management system including a monitoring device.

Embodiments of the invention are described below. The following embodiments are only illustrative of the invention and all the features described in the embodiments are not essential to the invention.

(1) OVERVIEW OF TECHNOLOGY INCLUDED IN INVENTION

First, an overview of a technology included in the invention is described with reference to examples illustrated in FIG. 1 to FIG. 13. The figures of the present application schematically illustrate the examples and may include inconsistency. Elements of this technology are not limited to specific examples denoted by reference symbols.

First Aspect

A monitoring device U0 according to one aspect of this technology includes an operation finish notification acquiring section U1 and a device information acquiring section U2, and acquires device information 620 to be collected from a device (for example, a multifunction peripheral 400). The operation finish notification acquiring section U1 acquires an operation finish notification 610 indicating that a predetermined operation performed by the device has been finished. The device information acquiring section U2 acquires the device information 620 from the device with a trigger of the acquisition of the operation finish notification 610.

Immediately after the acquisition of the operation finish notification 610 such as a printing finish notification or a scanning finish notification, it is highly likely that the device is not in a sleep mode (power saving mode). The device information 620 to be collected is acquired from the device at this timing, thereby reducing the frequency of recovery of the device from the sleep mode. According to the first aspect, it is possible to provide a monitoring device capable of reducing the power consumption of the device.

The device includes a printing device, an image reading device, a facsimile machine, a copying machine, a storage device, and a multifunction peripheral having functions of those devices.

The device information includes information indicating a remaining amount of a consumable item and information indicating a usage period of the consumable item.

The acquisition of the device information from the device includes direct acquisition of the device information from the device and acquisition of the device information from the device via a mediating element.

The predetermined operation which serves as a starting point of a period for a shift to the sleep mode when finished includes printing, image reading, facsimile transmission, and facsimile reception. The operation finish notification includes a printing finish notification, an image reading finish notification, a facsimile transmission finish notification, and a facsimile reception finish notification.

Second Aspect

As exemplified in FIG. 8 or other figures, the device information acquiring section U2 may avoid acquiring the device information 620 from the device until another subsequent operation finish notification 610 is acquired after the acquisition of the operation finish notification 610 that has triggered the acquisition of the device information 620.

In this aspect, the device information 620 is not acquired from the device until another subsequent operation finish notification 610 is issued after the operation finish notification 610 that has triggered the acquisition of the device information 620 has been issued from the device. Thus, it is possible to provide a suitable example of reduction in the power consumption of the device.

Third Aspect

Figure 13:
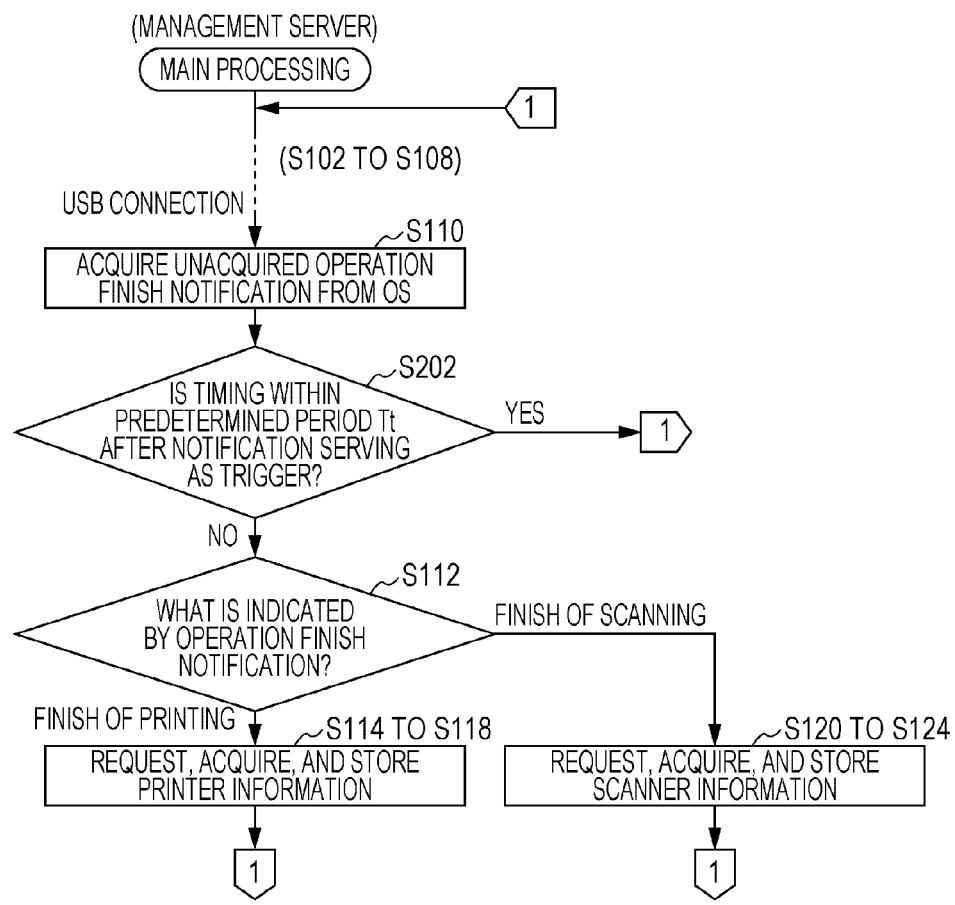
FIG. 13 is a flowchart illustrating an example of main processing in which a limitation of a predetermined period is set on acquisition of device information.

As exemplified in FIG. 13 or other figures, the device information acquiring section U2 may avoid acquiring the device information 620 from the device when another operation finish notification 610 is issued from the device within a predetermined period Tt after the acquisition of the operation finish notification 610 that has triggered the acquisition of the device information 620. In this aspect, the device information 620 is not acquired when another operation finish notification 610 is issued within the predetermined period Tt after the operation finish notification 610 that has triggered the acquisition of the device information 620 has been issued from the device. This configuration prevents the occurrence of a case in which the device information 620 is acquired more frequently than necessary. According to this aspect, it is possible to provide a suitable monitoring device that reduces the power consumption of the device.

This technology encompasses a case in which the limitation of the predetermined period is not set on the acquisition of the device information.

Fourth Aspect

Figure 12:
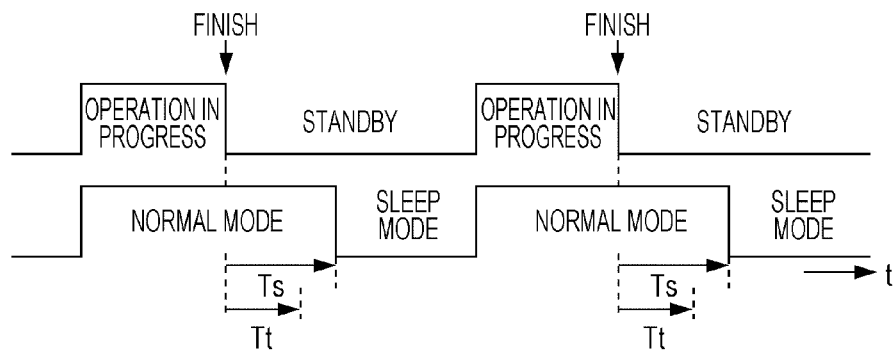
FIG. 12 is a timing chart schematically illustrating an example of a sleep shift period of a device.

As exemplified in FIG. 12 or other figures, the predetermined period Tt may be shorter than a period Ts for a shift to the sleep mode after the device has finished the predetermined operation. In this aspect, it is possible to avoid the occurrence of a case in which the device information is not acquired at all even when another operation finish notification is issued within a period before the device is shifted to the sleep mode after the operation finish notification that has triggered the acquisition of the device information has been issued from the device.

Fifth Aspect

As exemplified in FIG. 8 or other figures, a target device from which the device information 620 is acquired may be set in association with a content of the operation finish notification 610 acquired by the operation finish notification acquiring section U1. The device information acquiring section U2 may acquire the device information 620 from the target device that is set in association with the content of the operation finish notification 610 acquired by the operation finish notification acquiring section U1. In this aspect, the device information 620 is acquired from the target device that has performed an operation. This configuration prevents the occurrence of a case in which the device information 620 is acquired more frequently than necessary. According to this aspect, it is possible to provide a suitable monitoring device that reduces the power consumption of the device.

The target device may be an internal device included in a multifunction device or may also be a multifunction device including a plurality of internal devices. It is only necessary that the multifunction device include a plurality of internal devices. All the internal devices may be accommodated in the same casing or the plurality of internal devices may be constituted by a plurality of distributed portions as typified by a case in which the internal devices are accommodated in different casings.

This technology encompasses a case in which the target device from which the device information is acquired is not set.

Sixth Aspect

The device may be a multifunction device (for example, the multifunction peripheral 400) including a printing device 401 that outputs first device information (for example, printer information 621) as the device information 620, and an image reading device 402 that outputs second device information (for example, scanner information 622) as the device information 620. When the operation finish notification 610 acquired by the operation finish notification acquiring section U1 indicates that the printing has been finished, the device information acquiring section U2 may acquire the first device information (621) from the printing device 401. When the operation finish notification 610 acquired by the operation finish notification acquiring section U1 indicates that the image reading has been finished, the device information acquiring section U2 may acquire the second device information (622) from the image reading device 402. In this aspect, the first device information (621) is acquired from the printing device 401 included in the multifunction device (400) when the printing device 401 has performed an operation, and the second device information (622) is acquired from the image reading device 402 included in the multifunction device (400) when the image reading device 402 has performed an operation. This configuration prevents the occurrence of a case in which the device information 620 is acquired more frequently than necessary. According to this aspect, it is possible to provide a suitable example of reduction in the power consumption of the multifunction device.

This technology encompasses a case in which the device is not the multifunction device.

Seventh Aspect

As exemplified in FIG. 8 or other figures, the device information acquiring section U2 may acquire the first device information (621) from the printing device 401 through one of the following types of processing (a) and (b):
(a) when the monitoring device U0 is connected to the multifunction device (400) via a network N1, acquiring the first device information (621) from the multifunction device (400) via the network N1; and
(b) when the monitoring device U0 is connected to the multifunction device (400) via a universal serial bus (USB) interface, acquiring the first device information (621) via a first device driver (for example, a printer driver 311) for controlling the printing device 401.

When the multifunction device (400) is connected to a computer via the USB interface, the plurality of internal devices of the same multifunction device (400) may be recognized as different devices depending on specifications of an operating system (OS) of the computer. Therefore, when the monitoring device U0 is connected to the multifunction device (400) via the USB interface, it is suitable that the first device information (621) be acquired via the first device driver (311) for controlling the printing device 401. When the multifunction device (400) is connected to the computer via the network N1, the multifunction device (400) including the plurality of internal devices may be recognized as a single device in many cases. Therefore, when the monitoring device U0 is connected to the multifunction device (400) via the network N1, it is suitable that the first device information (621) be acquired from the multifunction device (400) via the network N1.

According to this aspect, it is possible to provide a suitable example of reduction in the power consumption of the multifunction device.

Eighth Aspect

As exemplified in FIG. 8 or other figures, the device information acquiring section U2 may acquire the second device information (622) from the image reading device 402 through one of the following types of processing (c) and (d):
(c) when the monitoring device U0 is connected to the multifunction device (400) via the network N1, acquiring the second device information (622) from the multifunction device (400) via the network N1; and
(d) when the monitoring device U0 is connected to the multifunction device (400) via the universal serial bus (USB) interface, acquiring the second device information (622) via a second device driver (for example, a scanner driver 312) for controlling the image reading device 402.

When the multifunction device (400) is connected to the computer via the USB interface, the plurality of internal devices of the same multifunction device (400) may be recognized as different devices depending on the specifications of the OS of the computer. Therefore, when the monitoring device U0 is connected to the multifunction device (400) via the USB interface, it is suitable that the second device information (622) be acquired via the second device driver (312) for controlling the image reading device 402. When the multifunction device (400) is connected to the computer via the network N1, the multifunction device (400) including the plurality of internal devices may be recognized as a single device in many cases. Therefore, when the monitoring device U0 is connected to the multifunction device (400) via the network N1, it is suitable that the second device information (622) be acquired from the multifunction device (400) via the network N1.

According to this aspect, it is possible to provide a suitable example of reduction in the power consumption of the multifunction device.

Ninth Aspect

A monitoring method according to one aspect of this technology includes an operation finish notification acquiring step ST1 corresponding to the operation finish notification acquiring section U1, and a device information acquiring step ST2 corresponding to the device information acquiring section U2. In this aspect, it is possible to provide a monitoring method capable of reducing the power consumption of the device.

Tenth Aspect

A monitoring program according to one aspect of this technology causes the computer to implement an operation finish notification acquiring function FU1 corresponding to the operation finish notification acquiring section U1, and a device information acquiring function FU2 corresponding to the device information acquiring section U2. In this aspect, it is possible to provide a monitoring program capable of reducing the power consumption of the device.

This technology is further applicable to, for example, a management system including the monitoring device, a method for controlling the monitoring device, a method for controlling the management system, a program for controlling the monitoring device, a program for controlling the management system, and a computer-readable medium that records the monitoring program and the control programs. The monitoring device and the management system may be constituted by a plurality of distributed portions.

(2) SPECIFIC EXAMPLE OF MONITORING DEVICE

FIG. 1 schematically exemplifies a management system SY1 including the monitoring device U0. The management system SY1 includes a management server 200 that is a server computer, clients 300, 330, 340 . . . that are client computers, multifunction peripherals 410 and 420 that are examples of the multifunction device, and a printer 431 that is a single-function device. The multifunction peripherals 410 and 420 are referred to collectively as the multifunction peripheral 400. It is assumed that the clients 300, 330, 340 . . . , the multifunction peripheral 400, and the printer 431 are installed within a relatively narrow range such as a space inside a business office or a branch office. However, the clients 300, 330, 340 . . . , the multifunction peripheral 400, and the printer 431 may be installed in distributed areas. It is assumed that the management server 200 is installed at a location relatively distant from the clients and the like, such as a space outside a business office or a branch office. However, the management server 200 may be installed within the installation range of the clients and the like.

In FIG. 1, the management server 200, the clients 300, 330, 340 . . . , the multifunction peripheral 420, and the printer 431 are connected to the network N1 and are capable of inputting/outputting information therebetween. Examples of the network N1 to be used may include the Internet, a local area network (LAN), a network connecting the LANs via a wide area network (WAN), and a wireless network such as a wireless LAN. The client 300 and the multifunction peripheral 410 are connected to each other via a USB interface and are capable of inputting/outputting information therebetween. The USB interface is an example of a general-purpose serial interface and USB-compatible devices can be connected to each other via a USB cable. The cable connection may be replaced with wireless connection. Due to specifications of the USB, the client 300 and the multifunction peripheral 410 are installed at relatively close locations. The number of clients included in the management system is not particularly limited and may be one. Further, the number of multifunction peripherals included in the management system is not particularly limited and may be one. The number of single-function devices included in the management system may be two or more and no single-function device may be included in the management system. The management server 200 may include a plurality of distributed computers.

The management server 200 illustrated in FIG. 1 includes a clock circuit 201, a central processing unit (CPU) 202, a non-volatile memory 203, a random access memory (RAM) 204, a network interface (I/F) 205, a display device (not shown), and an input device (not shown) (for example, a pointing device or a keyboard). The elements 201 to 205 and other elements are connected to each other and are capable of inputting/outputting data therebetween. The non-volatile memory 203 stores, for example, a management program P1 to be loaded into the RAM 204, a processing table TA1 in which contents of the operation finish notification 610 and respective types of processing are associated with each other, and a monitoring target list L1 that is a list of registered devices connected to the management system SY1. Examples of the non-volatile memory 203 to be used may include a read only memory (ROM), a non-volatile semiconductor memory such as a flash memory, and a magnetic recording medium such as a hard disk drive. The network I/F 205 is connected to the network N1 and performs processing of transmitting/receiving data to/from external devices (for example, the clients 300, 330, 340 . . . , the multifunction peripheral 420, and the printer 431) connected to the network N1.

The management server 200 may be constituted by a plurality of devices that are divided in a mutually communicable manner.

The client 300 illustrated in FIG. 1 includes a clock circuit 301, a CPU 302, a non-volatile memory 303, a RAM 304, a network I/F 305, a USB I/F 306, a display device (not shown), and an input device (not shown). The elements 301 to 306 and other elements are connected to each other and are capable of inputting/outputting data therebetween. The non-volatile memory 303 stores, for example, a mediating program P2 to be loaded into the RAM 304. The mediating program P2 causes the client 300 to implement a mediating section UP2 exemplified in FIG. 3. The management program P1 and the mediating program P2 are examples of the monitoring program. Examples of the non-volatile memory 303 to be used may include a ROM, a non-volatile semiconductor memory, and a magnetic recording medium. The network I/F 305 is connected to the network N1 and performs processing of transmitting/receiving data to/from the external devices connected to the network N1. The USB I/F 306 is connected to the multifunction peripheral 410 and performs processing of transmitting/receiving data to/from the multifunction peripheral 410.

The client 300 may be constituted by a plurality of devices that are divided in a mutually communicable manner. The configurations of the clients 330, 340 . . . are similar to the configuration of the client 300 and therefore description thereof is omitted.

The multifunction peripheral 410 illustrated in FIG. 1 includes a printer 411 that is an example of the printing device 401, a scanner 412 that is an example of the image reading device 402, and a facsimile machine 413. The multifunction peripheral 410 is connected to the client 300 via the USB interface. The multifunction peripheral 420 illustrated in FIG. 1 includes a printer 421 that is an example of the printing device 401, a scanner 422 that is an example of the image reading device 402, and a facsimile machine 423. The multifunction peripheral 420 is connected to the network N1. The printer 431 that is an example of the printing device 401 is also connected to the network N1. The printer 431 may be a stationary printing device or a portable printing device.

Each of the printers 411, 421, 431 . . . is a printing device that performs printing on a print substrate such as copy paper. For example, each of the printers 411, 421, 431 . . . forms an image corresponding to image data on the print substrate with ink (example of a color material). Each of the printers 411, 421, 431 . . . of this specific example is an ink jet printer, but an electrophotographic printer such as a laser printer may be used as each of the printers 411, 421, 431 . . . instead. Therefore, the color material that adheres to the print substrate may be toner or the like.

Each of the scanners 412 and 422 is an image reading device that reads an image on an original. For example, each of the scanners 412 and 422 reads the image on the original by irradiating the original with light from a light source, thereby forming corresponding image data. Examples of the scanners 412 and 422 to be used may include a flatbed scanner to be used by arranging the original between an original table glass and an original cover, and a scanner with an original feeder.

Each of the facsimile machines 413 and 423 is connected to a telephone line (not shown) and performs facsimile communication with another facsimile machine connected to the telephone line.

Figure 2:
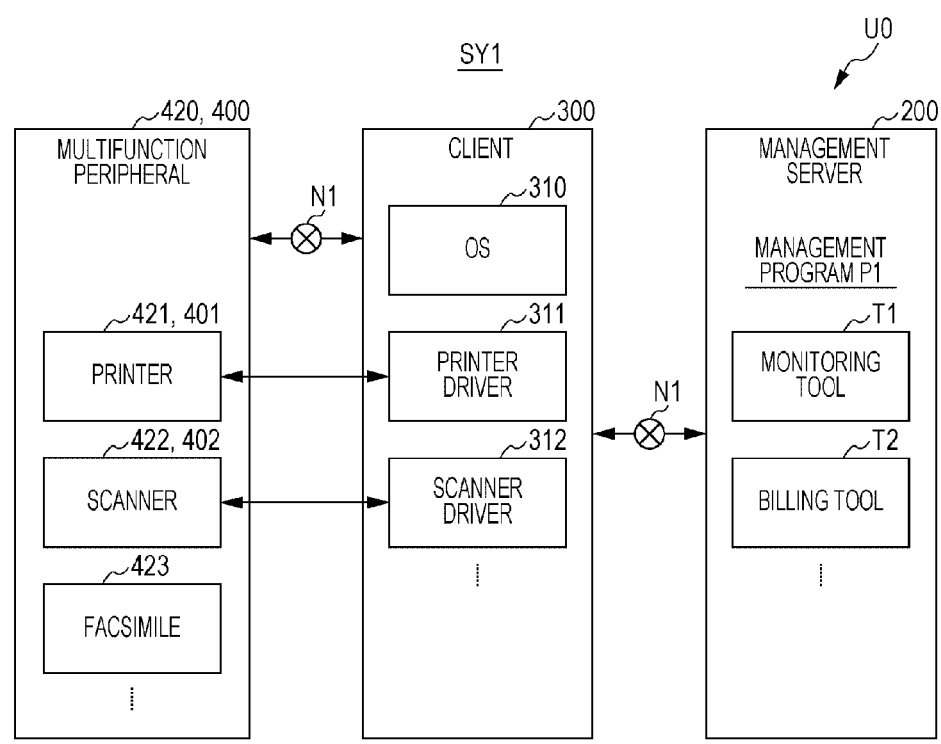
FIG. 2 is a block diagram schematically illustrating an example of the management system including the monitoring device to which a multifunction device is connected via a network.

FIG. 2 schematically exemplifies the management system SY1 including the monitoring device U0 to which the multifunction peripheral 420 is connected via the network. In this case, the management server 200 of the management system SY1 corresponds to the monitoring device U0. The multifunction peripheral 420 connected to the network N1 is recognized as a single device by the client 300.

The management server 200 illustrated in FIG. 2 is implemented by the management program P1 including a monitoring tool T1 and a billing tool T2. The monitoring tool T1 is a program for performing monitoring processing by collecting, from a device (multifunction peripheral 400, printer 431, or the like), device information to be collected in regard to the device. The billing tool T2 is a program for performing billing processing by collecting billing information indicating billing for use of the device.

The client 300 illustrated in FIG. 2 executes programs such as an operating system (OS) 310, the printer driver 311, and the scanner driver 312. The printer driver 311 causes the client 300 to implement a function of controlling an operation of the printer 421. The scanner driver 312 causes the client 300 to implement a function of controlling an operation of the scanner 422.

Figure 3:
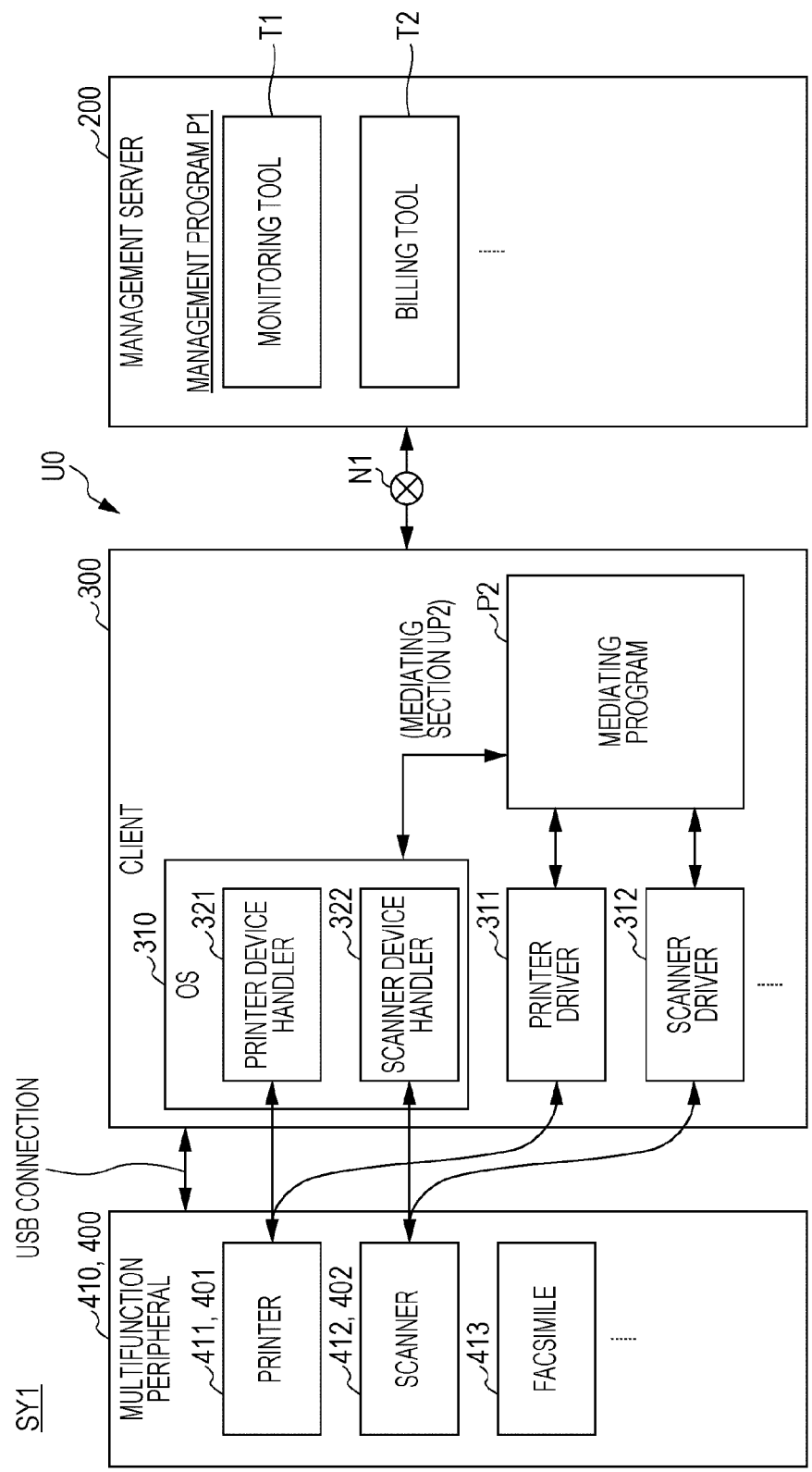
FIG. 3 is a block diagram schematically illustrating an example of the management system including the monitoring device to which the multifunction device is connected via a USB.

FIG. 3 schematically exemplifies the management system SY1 including the monitoring device U0 to which the multifunction peripheral 410 is connected via the USB interface. In this case, the management server 200 that executes the management program P1 and the client 300 that executes the mediating program P2 correspond to the monitoring device U0. The printer driver 311 illustrated in FIG. 3 is an example of the first device driver for controlling the operation of the printer 411. The scanner driver 312 illustrated in FIG. 3 is an example of the second device driver for controlling the operation of the scanner 412.

For example, it is assumed that the multifunction peripheral 410 and the client 300 are connected to each other via the USB when the printer 411 and the scanner 412 are controlled by different control devices in the multifunction peripheral 410. In this case, the OS 310 of the client 300 recognizes the printer 411 and the scanner 412 as different devices and handlers are generated for the printer 411 and the scanner 412, respectively. A printer device handler 321 is generated for the printer 411 and a scanner device handler 322 is generated for the scanner 412.

Figure 4:
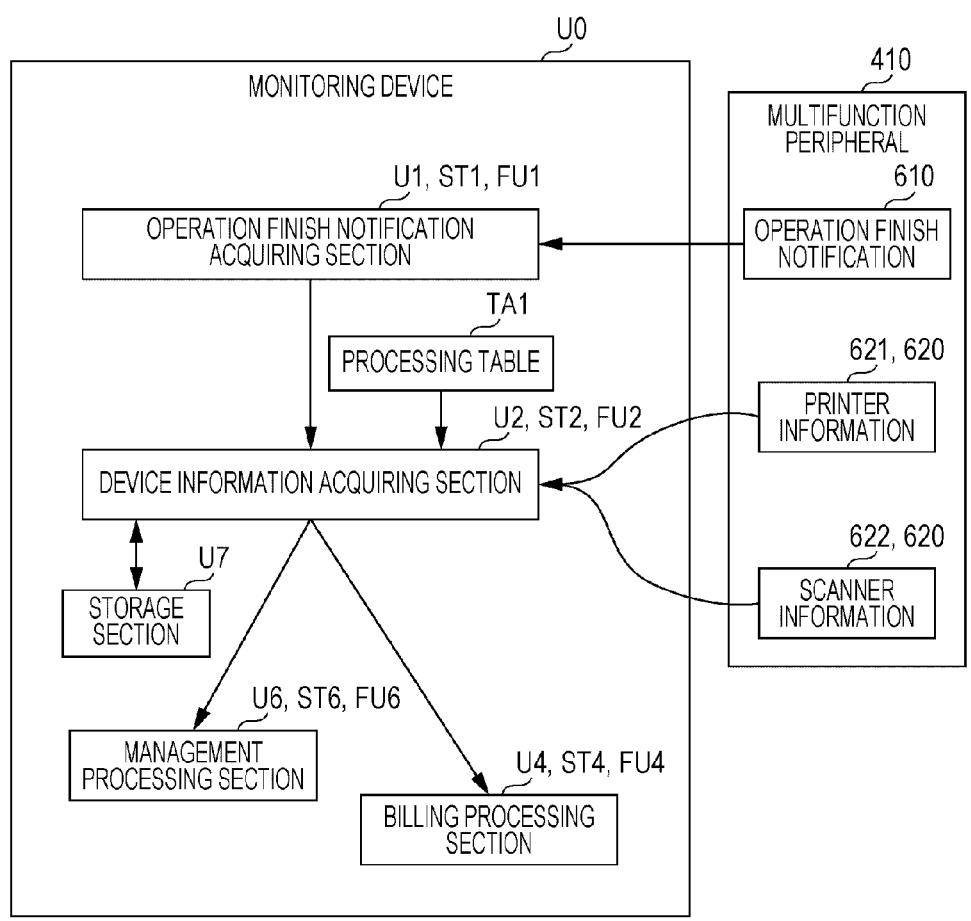
FIG. 4 is a block diagram schematically illustrating an example of the monitoring device.

FIG. 4 schematically exemplifies the monitoring device U0. The monitoring device U0 of this specific example is constituted by the management server 200 that executes the management program P1 and the client 300 that executes the mediating program P2. The monitoring device U0 illustrated in FIG. 4 includes the operation finish notification acquiring section U1, the device information acquiring section U2, a billing processing section U4, a management processing section U6, and a storage section U7. The monitoring method to be performed by the monitoring device U0 includes the operation finish notification acquiring step ST1, the device information acquiring step ST2, a billing processing step ST4, and a management processing step ST6. The programs P1 and P2 cause the computer to implement the operation finish notification acquiring function FU1, the device information acquiring function FU2, a billing processing function FU4, and a management processing function FU6.

First, the respective sections of the monitoring device U0 are briefly described.

The operation finish notification acquiring section U1 acquires the operation finish notification 610 indicating that a predetermined operation performed by the device (multifunction peripheral 410 in FIG. 4) has been finished. FIG. 5 schematically exemplifies contents of the operation finish notification 610. The operation finish notification 610 includes a printing finish notification, a scanning finish (image reading finish) notification, a facsimile transmission finish notification, and a facsimile reception finish notification. Although illustration is omitted, the operation finish notification may include a recording head cleaning finish notification and a USB connection completion notification.

As in the processing table TA1 exemplified in FIG. 6, respective types of processing to be performed in association with the contents of the operation finish notification 610 may be specified. In the example illustrated in FIG. 6, acquisition of the printer information 621 is specified when the printing finish notification is issued as the operation finish notification 610, and acquisition of the scanner information 622 is specified when the scanning finish notification is issued as the operation finish notification 610. In this case, the printer is a target device when the printing finish notification is issued, and the scanner is a target device when the scanning finish notification is issued. Thus, internal devices (examples of the target devices) from which the device information 620 is acquired are set for the multifunction peripheral 410 connected via the USB in association with the contents of the operation finish notification 610. Although illustration is omitted, when the facsimile transmission finish notification is issued as the operation finish notification, acquisition of a scanning history, a transmission history, or the like may be specified in the processing table. When the facsimile reception finish notification is issued as the operation finish notification, acquisition of a reception history, a printing history, a printing color (color or monochrome), a paper size, or the like may be specified in the processing table. When the cleaning finish notification is issued as the operation finish notification, acquisition of a remaining amount of ink or the like may be specified in the processing table.

The device information acquiring section U2 acquires the device information 620 from the device (410) with a trigger of the acquisition of the operation finish notification 610. The device information 620 is a generic term for the printer information 621 to be collected in regard to the printer 411 and the scanner information 622 to be collected in regard to the scanner 412. The printer information 621 is an example of the first device information, and the scanner information 622 is an example of the second device information. The device information acquiring section U2 may acquire the device information 620 in accordance with the processing specified in the processing table TA1. The device information acquiring section U2 stores the acquired device information 620 in the storage section U7 (for example, the non-volatile memories 203 and 303).

FIG. 7 schematically exemplifies details of the printer information 621 to be collected. The printer information 621 illustrated in FIG. 7 contains a remaining amount of a consumable item such as a remaining amount of ink, a usage period of a consumable item such as a usage period of a paper feed roller or the like, a model number of a consumable item such as a model number of ink, and information for billing amount calculation such as a print count. Of those pieces of information, the remaining amount of a consumable item, the usage period of a consumable item, and the print count are pieces of information that are changed in accordance with the operation of the printer 411. The model number of a consumable item is information that is not changed in accordance with the operation of the printer 411. Although illustration is omitted, the scanner information 622 to be collected contains a usage period of a consumable item such as a usage period of a paper feed roller or the like, and information for billing amount calculation. Of those pieces of information, the usage period of a consumable item is information that is changed in accordance with the operation of the scanner 412.

At a billing information collection timing for collecting billing information for use of the multifunction peripheral 410, the billing processing section U4 acquires, from the device, the device information 620 for collecting the billing information even if the printer 411 recovers from a sleep mode (power saving mode) to a normal mode (mode other than the power saving mode). The billing processing section U4 performs processing for charging a billing amount based on the acquired device information 620.

The management processing section U6 performs the monitoring processing or the like.

(3) EXAMPLES OF PROCESSING TO BE PERFORMED BY MONITORING DEVICE

Next, examples of processing to be performed by the monitoring device U0 are described. The management server 200 and the client 300 execute a plurality of types of processing in parallel by multitasking. The processing to be performed so as to implement this technology, such as the respective types of processing illustrated in FIG. 8 to FIG. 11 and FIG. 13, is not limited to the example in which the processing is executed by the CPU, and may be executed by other electronic components (for example, an application specific integrated circuit (ASIC)). The processing to be performed so as to implement this technology may be executed by a plurality of CPUs in a distributed manner, or may also be executed through a cooperative operation of the CPU and an electronic component (for example, an ASIC).

Figure 9:
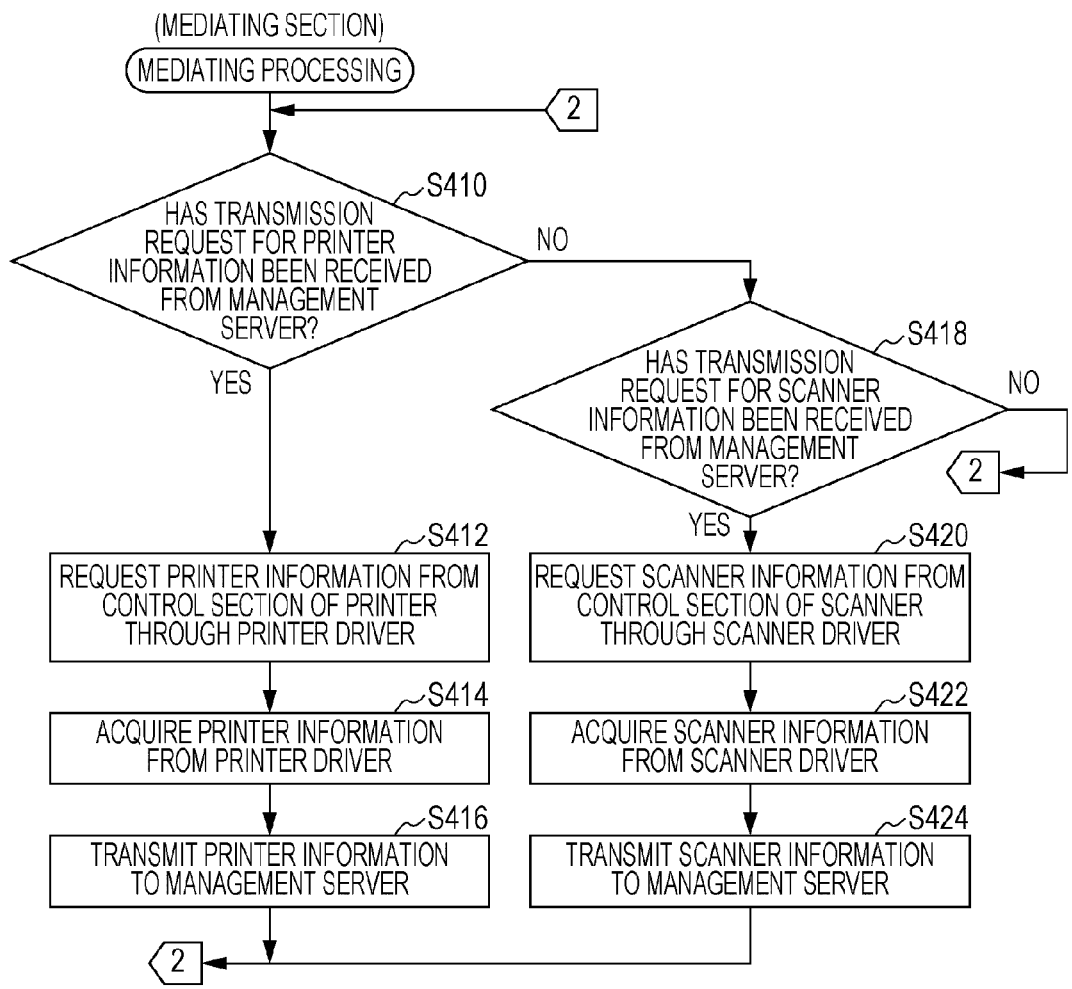
FIG. 9 is a flowchart illustrating an example of mediating processing to be performed by a mediating section.

FIG. 8 exemplifies main processing to be performed by the management server 200. FIG. 9 exemplifies mediating processing to be performed by the mediating section UP2 of the client 300. For convenience of description, the mediating processing of FIG. 9 is described first. The arrow to the connector 2 means that the processing is returned to S410.

When the mediating processing is started, the mediating section UP2 determines whether a transmission request for the printer information 621 has been received from the management server 200 (Step S410). The indication of "Step" is omitted hereinafter. When the transmission request for the printer information 621 has been received, the mediating section UP2 requests the printer information 621 from a control section of the printer 411 through the printer driver 311 (S412). The control section of the printer 411 that has received the request for the printer information 621 via the USB interface transmits the printer information 621 to the client 300 via the USB interface. The client 300 receives the printer information 621 by the function implemented by the printer driver 311. Therefore, the mediating section UP2 acquires the printer information 621 from the printer 411 via the printer driver 311 (S414) and transmits the printer information 621 to the management server 200 via the network N1 (S416). Then, the mediating section UP2 returns the processing to S410.

As described above, when the monitoring device U0 is connected to the multifunction peripheral 410 via the USB interface, the processing of acquiring the printer information 621 from the printer 411 via the printer driver 311 is performed.

When the transmission request for the printer information 621 has not been received, the mediating section UP2 determines whether a transmission request for the scanner information 622 has been received from the management server 200 (S418). When the transmission request for the scanner information 622 has been received, the mediating section UP2 requests the scanner information 622 from a control section of the scanner 412 through the scanner driver 312 (S420). The control section of the scanner 412 that has received the request for the scanner information 622 via the USB interface transmits the scanner information 622 to the client 300 via the USB interface. The client 300 receives the scanner information 622 by the function implemented by the scanner driver 312. Therefore, the mediating section UP2 acquires the scanner information 622 from the scanner 412 via the scanner driver 312 (S422) and transmits the scanner information 622 to the management server 200 via the network N1 (S424). Then, the mediating section UP2 returns the processing to S410.

As described above, when the monitoring device U0 is connected to the multifunction peripheral 410 via the USB interface, the processing of acquiring the scanner information 622 from the scanner 412 via the scanner driver 312 is performed. When the transmission request for the scanner information 622 has not been received, the mediating section UP2 returns the processing to S410.

FIG. 8 exemplifies the main processing for acquiring the device information 620 from the device connected via the USB with a trigger of the acquisition of the operation finish notification 610. The arrow to the connector 1 means that the processing is returned to S102 of FIG. 8. In the main processing illustrated in FIG. 8, internal devices from which the device information 620 is acquired are set in association with the contents of the operation finish notification 610. S106 to S110 correspond to the operation finish notification acquiring section U1, the operation finish notification acquiring function FU1, and the operation finish notification acquiring step ST1. S112 to S124 correspond to the device information acquiring section U2, the device information acquiring function FU2, and the device information acquiring step ST2.

When the main processing is started, the management server 200 branches the processing in accordance with a connection type as to whether a monitoring target device included in the monitoring target list L1 is connected via the network or the USB (S102). When the monitoring target device is connected to the network N1, the management server 200 acquires management information base (MIB) information of the monitoring target device through a network control section of the monitoring target device (S104) and performs the monitoring processing described later (for example, the monitoring processing illustrated in FIG. 10) although illustration is omitted. Then, the management server 200 returns the processing to S102. For example, when the monitoring target device is the multifunction peripheral 420 including the printer 421 and the scanner 422, the MIB information contains the printer information (621) and the scanner information (622). The management server 200 may periodically start the main processing at predetermined intervals, or may also start the main processing in response to a main processing execution instruction input to the management server 200.

When the monitoring target device is connected to the client 300 via the USB interface, the management server 200 accesses the OS 310 through the mediating section UP2 of the client 300 so as to acquire information indicating an operation finish notification which has newly been received by the OS 310 (S106). The management server 200 determines whether there is an unacquired operation finish notification 610 (S108). When there is an unacquired operation finish notification 610, the management server 200 advances the processing to S110. When there is no unacquired operation finish notification 610, the management server 200 returns the processing to S102.

When an event for notifying the mediating section UP2 that an operation finish notification has been received from the device is registered in the OS 310, processing of receiving the event from the OS 310 may be performed in S106 instead of accessing the OS 310.

In S110, the management server 200 acquires the unacquired operation finish notification 610 from the OS 310 through the mediating section UP2. Through the processing of S106 to S110, the management server 200 can grasp that the operation finish notification 610 has been issued from the device. Next, the management server 200 branches the processing in accordance with the content of the operation finish notification 610 acquired in S110 (S112). In S112, the management server 200 may refer to the processing table TA1 to perform processing associated with the content of the operation finish notification 610. FIG. 8 illustrates an example in which the processing of S114 to S118 is performed when a printing finish notification is issued as the operation finish notification 610 and the processing of S120 to S124 is performed when a scanning finish notification is issued as the operation finish notification 610.

When the operation finish notification 610 indicates that the printing has been finished, the management server 200 requests the printer information 621 from the control section of the printer 411 through the mediating section UP2 of the client 300 (S114). As illustrated in FIG. 9, the mediating section UP2 that has received the request for the printer information 621 acquires the printer information 621 from the printer 411. The management server 200 acquires the printer information 621 from the mediating section UP2 (S116) and stores the printer information 621 in the non-volatile memory 203 (S118). Then, the management server 200 performs the monitoring processing described later (for example, the monitoring processing illustrated in FIG. 10) although illustration is omitted. Then, the management server 200 returns the processing to S102.

When the operation finish notification 610 indicates that the scanning has been finished, the management server 200 requests the scanner information 622 from the control section of the scanner 412 through the mediating section UP2 of the client 300 (S120). As illustrated in FIG. 9, the mediating section UP2 that has received the request for the scanner information 622 acquires the scanner information 622 from the scanner 412. The management server 200 acquires the scanner information 622 from the mediating section UP2 (S122) and stores the scanner information 622 in the non-volatile memory 203 (S124). Then, the management server 200 performs the monitoring processing described later (for example, the monitoring processing illustrated in FIG. 10) although illustration is omitted. Then, the management server 200 returns the processing to S102.

As described above, the device information 620 is acquired from the internal device that is set in association with the content of the operation finish notification 610.

Through repetition of the processing of S106 to S124, the device information 620 is repeatedly acquired from the device and stored with a trigger of the acquisition of the operation finish notification 610. Thus, the stored device information 620 is used for the monitoring processing. Further, the processing of S102, S106, and S108 is repeated for the device connected via the USB until another subsequent operation finish notification 610 is acquired after the acquisition of the operation finish notification 610 in S110. Thus, the device information 620 is not acquired from the device.

Figure 10:
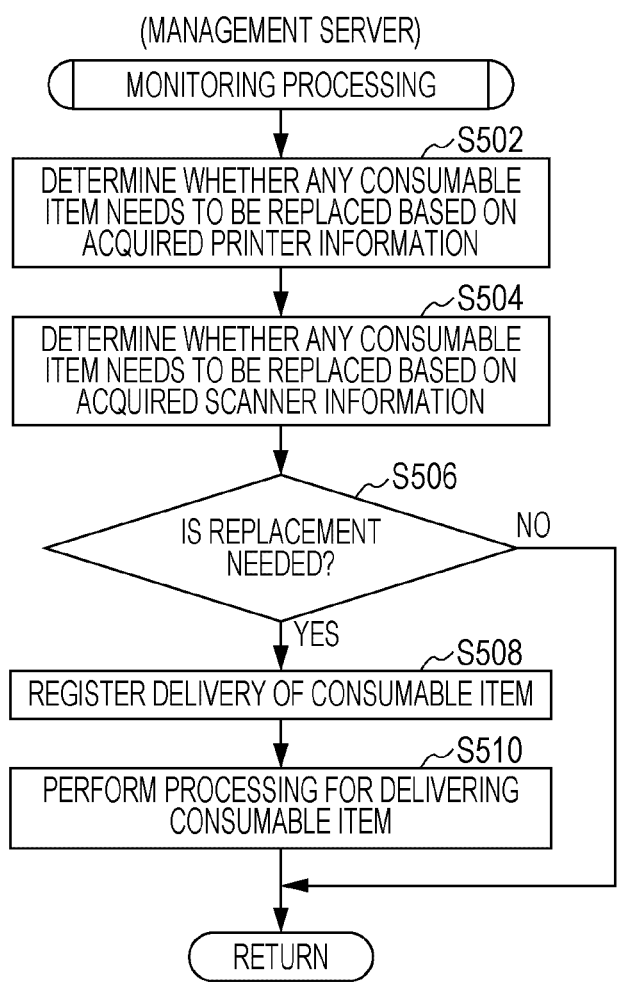
FIG. 10 is a flowchart illustrating an example of monitoring processing to be performed by the management server.

FIG. 10 illustrates an example of the monitoring processing to be performed after S104, S118, and S124 of the main processing illustrated in FIG. 8. This processing corresponds to the management processing section U6, the management processing function FU6, and the management processing step ST6.

When the monitoring processing is started, the management server 200 determines whether any consumable item needs to be replaced based on the printer information 621 acquired in the main processing (including the printer information contained in the MIB information) (S502). For example, when the remaining amount of ink that is indicated by the printer information 621 is smaller than a predetermined threshold, the management server 200 can determine that the replacement is needed. When the remaining amount of the ink is equal to or larger than the threshold, the management server 200 can determine that the replacement is not needed. The determination may similarly be made for the remaining amount, the usage period, or the like of a consumable item other than the ink.

The management server 200 also determines whether any consumable item needs to be replaced based on the scanner information 622 acquired in the main processing (including the scanner information contained in the MIB information) (S504). For example, when the usage period of a paper feed roller that is indicated by the scanner information 622 is longer than a threshold, the management server 200 can determine that the replacement is needed. When the usage period is shorter than the threshold, the management server 200 can determine that the replacement is not needed. The determination may similarly be made for the usage period or the like of a consumable item other than the paper feed roller.

Then, the management server 200 determines whether any consumable item needs to be replaced in S502 and S504 (S506). When any consumable item needs to be replaced, the management server 200 performs processing of registering delivery of the consumable item that needs to be replaced (S508). Then, the management server 200 performs processing for delivering the consumable item that needs to be replaced (S510) and terminates the monitoring processing. The processing for delivering the consumable item may be, for example, processing of transmitting, to an email address of a salesperson, an email indicating an order for delivery of the consumable item. The salesperson who has viewed a display of a computer that has received the email only needs to visit, with the consumable item, the location where the multifunction peripheral 400 is installed and supply the consumable item to the multifunction peripheral 400.

Figure 11:
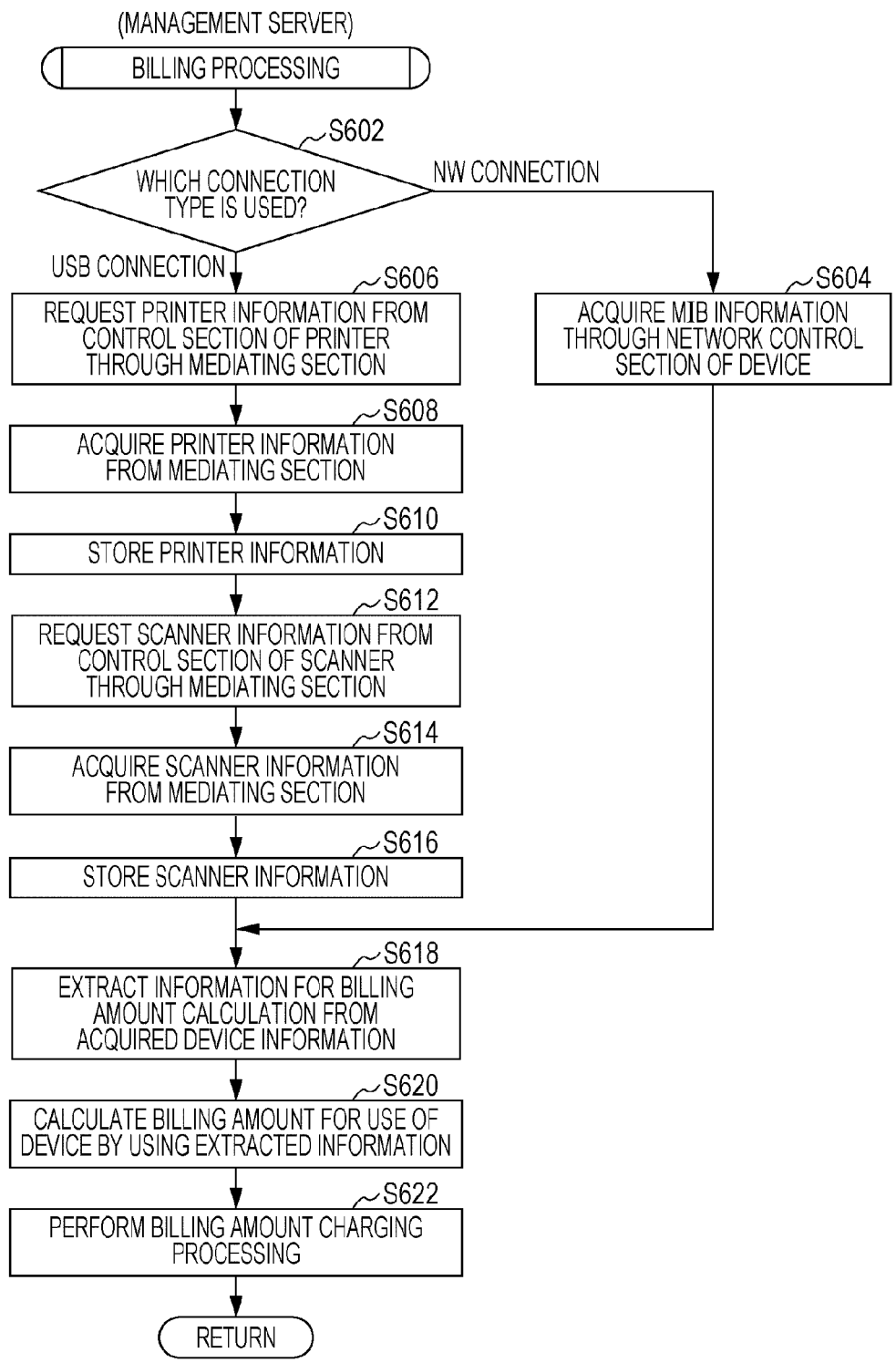
FIG. 11 is a flowchart illustrating an example of billing processing to be performed by the management server.

FIG. 11 illustrates an example of the billing processing to be performed by the management server 200. This processing is performed at a billing information collection timing for collecting billing information for use of the device irrespective of whether the device is in the sleep mode. For example, when billing is made at the end of every month, the billing information collection timing is a predetermined time on the last day of every month. In this case, the management server 200 only needs to determine whether the date and time of the clock circuit 201 match the billing information collection timing and perform processing of S602 to S622 when the date and time match the billing information collection timing. The billing processing corresponds to the billing processing section U4, the billing processing function FU4, and the billing processing step ST4.

When the billing processing is started, the management server 200 branches the processing in accordance with the connection type as to whether the monitoring target device is connected via the network or the USB (S602). When the monitoring target device is connected to the network N1, the management server 200 acquires the MIB information of the monitoring target device through the network control section of the monitoring target device (S604). Then, the management server 200 advances the processing to S618. For example, when the monitoring target device is the multifunction peripheral 420 including the printer 421 and the scanner 422, the MIB information contains the printer information (621) and the scanner information (622).

When the monitoring target device is connected to the client 300 via the USB interface, the management server 200 requests the printer information 621 from the control section of the printer 411 through the mediating section UP2 of the client 300 (S606). As illustrated in FIG. 9, the mediating section UP2 acquires the printer information 621 from the printer 411. At this time, the printer 411 may recover from the sleep mode. The management server 200 acquires the printer information 621 from the mediating section UP2 (S608) and stores the printer information 621 in the non-volatile memory 203 (S610). Further, the management server 200 requests the scanner information 622 from the control section of the scanner 412 through the mediating section UP2 of the client 300 (S612). As illustrated in FIG. 9, the mediating section UP2 acquires the scanner information 622 from the scanner 412. At this time, the scanner 412 may recover from the sleep mode. The management server 200 acquires the scanner information 622 from the mediating section UP2 (S614) and stores the scanner information 622 in the non-volatile memory 203 (S616).

In S618, the management server 200 extracts information for billing amount calculation from the acquired device information 620 (including the MIB information). For example, when a color print count (denoted by Nc) and a monochrome print count (denoted by Nm) per month, which are contained in the printer information 621 (including the printer information contained in the MIB information), are used for the billing amount calculation, the management server 200 only needs to extract the color print count Nc and the monochrome print count Nm from the printer information 621.

Next, the management server 200 calculates a billing amount for use of the device such as the multifunction peripheral 400 by using the information extracted in S618 (S620). For example, when a monthly minimum amount is Cmin, a rate of color printing per copy is Uc, and a rate of monochrome printing per copy is Um, the billing amount for use of the multifunction peripheral 400 may be determined as a calculated value Uc×Nc+Um×Nm when the calculated value Uc×Nc+Um×Nm is equal to or larger than the minimum amount Cmin, or as the minimum amount Cmin when the calculated value Uc×Nc+Um×Nm is smaller than the minimum amount Cmin.

The billing amount may be determined by various methods depending on contract. For example, when a scan count (denoted by Nscan) per month, which is contained in the scanner information 622 (including the scanner information contained in the MIB information), is used for the billing amount calculation, the scan count Nscan may be extracted from the scanner information 622 and the billing amount may be determined by adding an amount obtained by multiplying the scan count Nscan by a rate. Further, the billing amount may be determined by adding a cost of a consumable item.

The billing amount may be determined without adding the print count.

Then, the management server 200 performs processing for charging the determined billing amount (S622) and terminates the billing processing. The processing for charging the billing amount may be, for example, processing of transmitting, to an email address of a user of the device such as the multifunction peripheral 400, an email indicating that a bill for the billing amount has been issued.

When the scanner information 622 is not used for the billing amount calculation, only the printer information 621 may be acquired without acquiring the scanner information 622. When the printer information 621 is not used for the billing amount calculation, only the scanner information 622 may be acquired without acquiring the printer information 621.

As described above, in this specific example, in the cases other than the case of the billing processing, the device information 620 is acquired from the device connected via the USB with a trigger of the acquisition of the operation finish notification 610 indicating that the predetermined operation performed by the device, such as printing or scanning, has been finished. Immediately after the acquisition of the operation finish notification 610, it is highly likely that the device is not in the sleep mode. The device information 620 to be collected is acquired from the device at this timing, thereby reducing the frequency of recovery of the device from the sleep mode. According to this specific example, the power consumption of the device can be reduced.

(4) MODIFIED EXAMPLES

Various modified examples are conceivable for the invention.

For example, the multifunction device may include three or more internal devices. Therefore, the facsimile machine 413 included in the multifunction peripheral 410 illustrated in FIG. 3, a storage (storage device) (not shown), or the like may be applied to the internal device. The storage or the like may externally be connected to a main body of the multifunction device.

The respective types of processing described above may be modified as appropriate by, for example, changing the order of steps. For example, in the billing processing of FIG. 11, the processing of S612 to S616 for requesting, acquiring, and storing the scanner information may be performed prior to the processing of any one of S606, S608, and S610 for requesting, acquiring, and storing the printer information. In the mediating processing of FIG. 9, the determination processing of S418 may be performed prior to the determination processing of S410.

Predetermined items of the device information may collectively be acquired irrespective of the contents of the operation finish notification. For example, in the main processing illustrated in FIG. 8, the processing of S114 to S124 may entirely be performed after the processing of S110 without performing the determination processing of S112.

In addition to the acquisition of the device information from the device with a trigger of the acquisition of the operation finish notification, the device information may be acquired from the device without the trigger of the acquisition of the operation finish notification. This technology also encompasses this case. For example, the device information may be acquired periodically (for example, at noon on weekdays) with a frequency which is generally lower than the frequency of the operation finish notification.

In the examples described above, the device information is acquired from the device connected via the USB with a trigger of the acquisition of the operation finish notification. The device information may be acquired from the device connected via the network with a trigger of the acquisition of the operation finish notification.

In the examples described above, the monitoring device U0 is constituted by the management server 200 and the client 300. The monitoring device may be constituted by the management server alone or the client alone.

As in the timing chart exemplified in FIG. 12, the sleep shift period Ts (Ts>0) for a shift to the sleep mode after the predetermined operation has been finished is set in the device so as to achieve power saving. In FIG. 12, the horizontal axis represents a time t, the upper side of the timing chart represents whether the device is performing an operation or on standby (not performing an operation), and the lower side of the timing chart represents whether the power supply mode of the device is the sleep mode or the normal mode (mode other than the sleep mode). Examples of "OPERATION IN PROGRESS" include printing in progress in the case of the printer and scanning in progress in the case of the scanner. As illustrated in FIG. 12, the power supply mode is shifted from the normal mode to the sleep mode when the sleep shift period Ts has elapsed after the finish of the predetermined operation. When the predetermined operation is started, the power supply mode is shifted from the sleep mode to the normal mode. When a certain operation is finished and then a subsequent operation is started within the sleep shift period Ts, the normal mode continues.

When the device repeatedly performs operations at close intervals in the case of acquiring the device information 620 constantly with a trigger of the acquisition of the operation finish notification 610, the device information 620 is acquired more frequently than necessary. Therefore, another operation finish notification 610 may be ignored within the predetermined period Tt (Tt>0) after the acquisition of the operation finish notification 610 that has triggered the acquisition of the device information 620. When the predetermined period Tt is set shorter than the sleep shift period Ts, it is possible to avoid the occurrence of a case in which the device information 620 is not acquired at all even when another operation finish notification 610 is issued within a period before the device is shifted to the sleep mode after the operation finish notification 610 that has triggered the acquisition of the device information 620 has been issued from the device.

FIG. 13 exemplifies main processing in which the limitation of the predetermined period Tt is set on the acquisition of the device information 620. Compared with the main processing illustrated in FIG. 8, this processing includes determination processing of S202 that is added between S110 and S112. The processing of S102 to S110 and S112 to S124 is approximately the same as that in the main processing of FIG. 8 and is therefore simply illustrated in FIG. 13. S202 and S112 to S124 correspond to the device information acquiring section U2, the device information acquiring function FU2, and the device information acquiring step ST2.

When the monitoring target device is connected via the USB, the management server 200 acquires an unacquired operation finish notification 610 from the OS 310 (S110). Then, the management server 200 determines whether the timing is within the predetermined period Tt after the acquisition of the operation finish notification 610 that has triggered the acquisition of the device information 620 (S202). When the timing is within the predetermined period Tt, the management server 200 returns the processing to S102. Thus, when the timing is within the predetermined period Tt, the device information 620 is not acquired even when the unacquired operation finish notification 610 is acquired (issued).

When the timing is out of the predetermined period Tt, the management server 200 branches the processing in accordance with the content of the operation finish notification 610 (S112). When the operation finish notification 610 indicates that the printing has been finished, the management server 200 performs the processing of S114 to S118 and returns the processing to S102. When the operation finish notification 610 indicates that the scanning has been finished, the management server 200 performs the processing of S120 to S124 and returns the processing to S102. Thus, the management server 200 acquires the device information 620 from the device when the predetermined period Tt has elapsed after the acquisition of the operation finish notification 610 that has triggered the acquisition of the device information 620.

As described above, this processing avoids the occurrence of a case in which the device information 620 is acquired more frequently than necessary because the operation finish notification 610 is issued from the device at close intervals. According to the example illustrated in FIG. 13, the power consumption of the device can further be reduced.

(5) CLOSING

As described above, according to various aspects of the invention, it is possible to provide a technology and the like capable of reducing the power consumption of the device. The technology defined only by the constituent elements according to the main aspects of the invention can attain the basic operations and advantages described above.

A configuration obtained by substituting or changing the combination of the configurations disclosed in the example described above, a configuration obtained by substituting or changing the combination of publicly-known technologies and the configurations disclosed in the example described above, and the like are applicable as well. The invention encompasses those configurations and the like.

The entire disclosure of Japanese Patent Application No. 2016-208387, filed Oct. 25, 2016 is expressly incorporated by reference herein.

What is claimed is:

1. A monitoring device that acquires device information to be collected from a device in a manner that reduces the power consumption of the device, the device having a power saving mode, the monitoring device comprising:
    an operation finish notification acquiring section on a server that accesses an operating system of a client through a mediating section on the client and acquires an operation finish notification indicating that a predetermined operation performed by the device in communication with the client has been finished; and
    a device information acquiring section on the server that acquires the device information from the device with a trigger to acquire the device information being the acquisition of the operation finish notification from the client, wherein tying the operation of the operation finish notification acquiring section and the device information acquiring section reduces recovery from power saving mode instances and reduces power consumption of the device.

2. The monitoring device according to claim 1, wherein the device information acquiring section avoids acquiring the device information from the device until another subsequent operation finish notification is acquired after the acquisition of the operation finish notification that has triggered the acquisition of the device information.

3. The monitoring device according to claim 1, wherein the device information acquiring section avoids acquiring the device information from the device when another operation finish notification is issued from the device within a predetermined period after the acquisition of the operation finish notification that has triggered the acquisition of the device information.

4. The monitoring device according to claim 3, wherein the predetermined period is shorter than a period for a shift to a sleep mode after the device has finished the predetermined operation.

5. The monitoring device according to claim 1,
    wherein a target device from which the device information is acquired is set in association with a content of the operation finish notification acquired by the operation finish notification acquiring section, and
    wherein the device information acquiring section acquires the device information from the target device that is set in association with the content of the operation finish notification acquired by the operation finish notification acquiring section.

6. The monitoring device according to claim 1,
wherein the device is a multifunction device including a printing device that outputs first device information as the device information, and an image reading device that outputs second device information as the device information, and
wherein the device information acquiring section is configured to:
acquire the first device information from the printing device when the operation finish notification acquired by the operation finish notification acquiring section indicates that printing has been finished; and
acquire the second device information from the image reading device when the operation finish notification acquired by the operation finish notification acquiring section indicates that image reading has been finished.

7. The monitoring device according to claim 1,
wherein the device is a multifunction device including a printing device that outputs first device information as the device information, and
wherein the device information acquiring section acquires the first device information from the printing device through one of the following types of processing:
when the monitoring device is connected to the multifunction device via a network, acquiring the first device information from the multifunction device via the network; and
when the monitoring device is connected to the multifunction device via a universal serial bus (USB) interface, acquiring the first device information via a first device driver for controlling the printing device.

8. The monitoring device according to claim 1,
wherein the device is a multifunction device including an image reading device that outputs second device information as the device information, and
wherein the device information acquiring section acquires the second device information from the image reading device through one of the following types of processing:
when the monitoring device is connected to the multifunction device via a network, acquiring the second device information from the multifunction device via the network; and
when the monitoring device is connected to the multifunction device via a universal serial bus (USB) interface, acquiring the second device information via a second device driver for controlling the image reading device.

9. A monitoring method for acquiring device information to be collected from a device in a manner that reduces the power consumption of the device, the device having a power saving mode, the monitoring method comprising:
acquiring an operation finish notification from the device indicating that a predetermined operation performed by the device has been finished, the operation finish notification on the device being accessed by an operation finish notification acquiring section of a server requesting the operation finish notification through a mediating section on a client in communication with the device; and
triggered by access to the operation finish notification, acquiring the device information from the device, wherein tying the operation of the operation finish notification acquiring section and the device information acquiring section reduces instances of recovery from power saving mode and reduces power consumption of the device.

10. The monitoring method according to claim 9, wherein the acquiring the device information includes avoiding acquiring the device information from the device until another subsequent operation finish notification is acquired after the acquisition of the operation finish notification that has triggered the acquisition of the device information.

11. The monitoring method according to claim 9, wherein the acquiring the device information includes avoiding acquiring the device information from the device when another operation finish notification is issued from the device within a predetermined period after the acquisition of the operation finish notification that has triggered the acquisition of the device information.

12. The monitoring method according to claim 11, wherein the predetermined period is shorter than a period for a shift to the power saving mode after the device has finished the predetermined operation.

13. The monitoring method according to claim 9,
wherein a target device from which the device information is acquired is set in association with a content of the acquired operation finish notification, and
wherein the acquiring the device information includes acquiring the device information from the target device that is set in association with the content of the acquired operation finish notification.

14. The monitoring method according to claim 9,
wherein the device is a multifunction device including a printing device that outputs first device information as the device information, and an image reading device that outputs second device information as the device information, and
wherein the acquiring the device information includes:
acquiring the first device information from the printing device when the acquired operation finish notification indicates that printing has been finished; and
acquiring the second device information from the image reading device when the acquired operation finish notification indicates that image reading has been finished.

15. The monitoring method according to claim 9,
wherein the device is a multifunction device including a printing device that outputs first device information as the device information, and
wherein the acquiring the device information includes acquiring the first device information from the printing device through one of the following types of processing:
when a monitoring device that acquires the first device information is connected to the multifunction device via a network, acquiring the first device information from the multifunction device via the network; and
when the monitoring device is connected to the multifunction device via a universal serial bus (USB) interface, acquiring the first device information via a first device driver for controlling the printing device.

16. The monitoring method according to claim 9,
wherein the device is a multifunction device including an image reading device that outputs second device information as the device information, and
wherein the acquiring the device information includes acquiring the second device information from the image reading device through one of the following types of processing:
when a monitoring device that acquires the second device information is connected to the multifunction device via a network, acquiring the second device information from the multifunction device via the network; and when the monitoring device is connected to the multi-function device via a universal serial bus (USB) interface, acquiring the second device information via a second device driver for controlling the image reading device.

17. A non-transient computer-readable recording medium that records a monitoring program for acquiring device information to be collected from a device, the monitoring program causing a computer to implement:
an operation finish notification acquiring function for acquiring an operation finish notification, from the device, indicating that a predetermined operation performed by the device has been finished, the operation finish notification on the device being accessed by an operation finish notification acquiring section of a server requesting the operation finish notification through a mediating section on a client in communication with the device; and
a device information acquiring function for acquiring the device information from the device to reduce instances of recovering the device from the power saving mode and so reduce power consumer of the device, the device information acquiring function being triggered by access of the server to the operation finish notification.

* * * * *